(12) United States Patent
Claudio et al.

(10) Patent No.: US 11,629,065 B2
(45) Date of Patent: Apr. 18, 2023

(54) PERFORATED SCREEN CONVERSION KIT

(71) Applicant: PARKSON CORPORATION, Fort Lauderdale, FL (US)

(72) Inventors: Rui Manuel Claudio, Coral Springs, FL (US); Philip Carl Herrmann, Grayslake, IL (US); Steven Wayne Sharp, Aurora, IL (US)

(73) Assignee: PARKSON CORPORATION, Ft, Lauderdale, FL (US)

( * ) Notice: Subject to any disclaimer, the term of this patent is extended or adjusted under 35 U.S.C. 154(b) by 409 days.

(21) Appl. No.: 16/482,528

(22) PCT Filed: Feb. 8, 2018

(86) PCT No.: PCT/US2018/017324
§ 371 (c)(1),
(2) Date: Jul. 31, 2019

(87) PCT Pub. No.: WO2018/148349
PCT Pub. Date: Aug. 16, 2018

(65) Prior Publication Data
US 2021/0130192 A1 May 6, 2021

Related U.S. Application Data

(60) Provisional application No. 62/457,411, filed on Feb. 10, 2017.

(51) Int. Cl.
*C02F 1/00* (2006.01)
*B01D 33/333* (2006.01)
(Continued)

(52) U.S. Cl.
CPC ............ *C02F 1/004* (2013.01); *B01D 33/333* (2013.01); *B01D 33/803* (2013.01); *B65G 17/40* (2013.01);
(Continued)

(58) Field of Classification Search
CPC .. C02F 1/004; C02F 1/00; C02F 1/001; C02F 1/26; C02F 2303/14; C02F 2303/24;
(Continued)

(56) References Cited

U.S. PATENT DOCUMENTS

| 4,784,544 A | * | 11/1988 | Moritz | B23Q 11/085 |
| | | | | 408/234 |
| 6,294,085 B1 | * | 9/2001 | Bache | B01D 33/04 |
| | | | | 210/155 |
| 2006/0070858 A1 | * | 4/2006 | de Swardt | B01D 33/333 |
| | | | | 198/803.2 |

FOREIGN PATENT DOCUMENTS

| DE | 3047711 A1 | * | 7/1982 | ............. B65G 17/38 |
| DE | 3047711 A1 | | 7/1982 | |

(Continued)

OTHER PUBLICATIONS

DE 3047711 A1 English description, Jul. 1982, Poerink Jannes Jonge.*

*Primary Examiner* — Akash K Varma
(74) *Attorney, Agent, or Firm* — Tarolli, Sundheim, Covell & Tummino LLP

(57) ABSTRACT

A wastewater filter conversion kit for replacing filter elements connected to a shaft includes first and second conveyor segments. Each conveyor segment includes a perforated panel. At least one first tube is secured to a first end of the panel. At least one second tube is secured to a second end of the panel. The least one first tube on the first conveyor segment and the at least one second tube on the second conveyor segment are aligned along a common centerline for receiving the shaft to replace the filter elements on the shaft.

8 Claims, 15 Drawing Sheets

(51) Int. Cl.
*B01D 33/80* (2006.01)
*B65G 17/40* (2006.01)

(52) U.S. Cl.
CPC ...... *C02F 2303/14* (2013.01); *C02F 2303/24* (2013.01)

(58) Field of Classification Search
CPC .... B01D 33/333; B01D 33/803; B01D 33/80; B65G 17/40; B65G 17/08; B65G 17/38; B65G 17/064; B65G 2201/02; Y02W 10/00
USPC ........................................................ 210/232
See application file for complete search history.

(56) References Cited

FOREIGN PATENT DOCUMENTS

| | | | | |
|---|---|---|---|---|
| GB | 1463226 | * | 7/1975 | ............. B65G 17/08 |
| GB | 1463226 | | 2/1977 | |

* cited by examiner

PERFORATED SCREEN CONVERSION KIT

CROSS REFERENCES TO RELATED APPLICATIONS

This application filed under 35 U.S.C § 371 is a national phase application of International Application Serial Number PCT/US2018/017324 filed Feb. 8, 2018 which claims priority to U.S. Provisional Application 62/457,411, filed Feb. 10, 2017.

TECHNICAL FIELD

The present invention relates to a water or wastewater filter conversion kit and, in particular, relates to a kit for converting an element filter assembly to a perforated screen assembly in a wastewater treatment system.

BACKGROUND

Filtering devices are used to treat wastewater by removing solids and other debris from the incoming, unfiltered water stream. The filtering device typically includes a series of elongated, hook-shaped filtering elements that are secured to driven chains to form an endless loop. It may be desirable from time to time to remove the elongated filtering elements in favor of a screen-type filter, depending on the type of debris to be removed, the nature of the incoming wastewater, etc.

SUMMARY

In one example of the invention, a wastewater filter conversion kit for replacing filter elements connected to a shaft includes first and second conveyor segments. Each conveyor segment includes a perforated panel. At least one first tube is secured to a first end of the panel. At least one second tube is secured to a second end of the panel. The least one first tube on the first conveyor segment and the at least one second tube on the second conveyor segment are aligned along a common centerline for receiving the shaft to replace the filter elements on the shaft.

In another example, a method of replacing filter elements in a wastewater treatment system connected to chains by filter shafts includes providing first and second conveyor segments. Each conveyor segment include a perforated panel, at least one first tube secured to a first end of the panel, and at least one second tube secured to a second end of the panel. The filter shafts are removed from the filter elements without removing the chains. The least one first tube on the first conveyor segment is aligned with the at least one second tube on the second conveyor along a common centerline. One of the filter shafts is inserted into the aligned at least one first and second tubes to form a hinged connection between the first and second conveyor segments.

Other objects and advantages and a fuller understanding of the invention will be had from the following detailed description and the accompanying drawings.

DETAILED DESCRIPTION

The present invention relates to a water or wastewater filter conversion kit and, in particular, relates to a kit for converting an element filter assembly to a perforated screen assembly in a water or wastewater treatment system. The perforated screen can be a perforated panel having, for example, a planar, multi-planar, L-shaped, step-shaped, round, circular, etc., shape. The perforations can have any shape, e.g., round, circular, elliptical, oval or polygonal.

Figure 1:
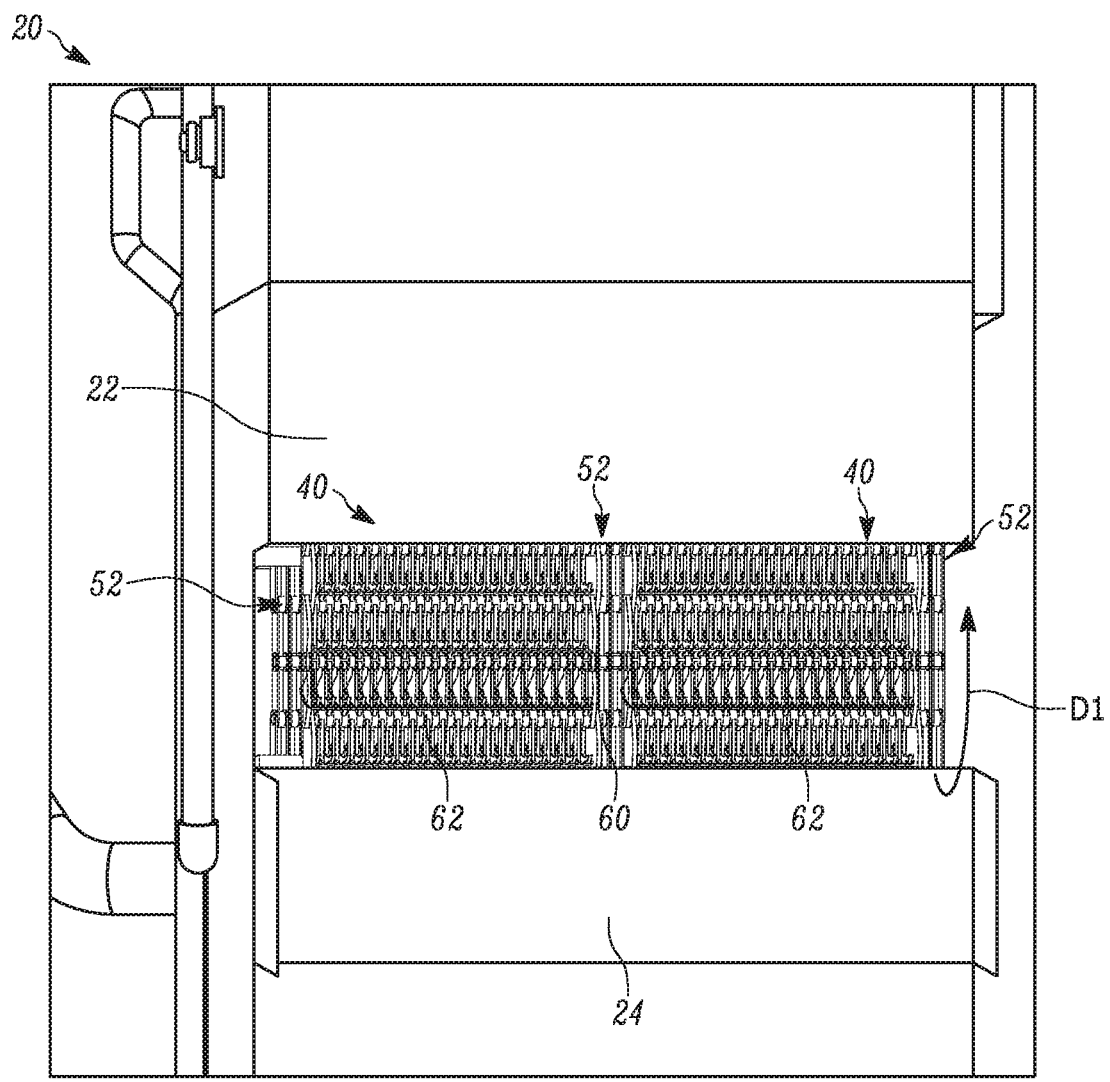
FIG. 1 is a schematic illustration of a sample water treatment system.
Figure 2:
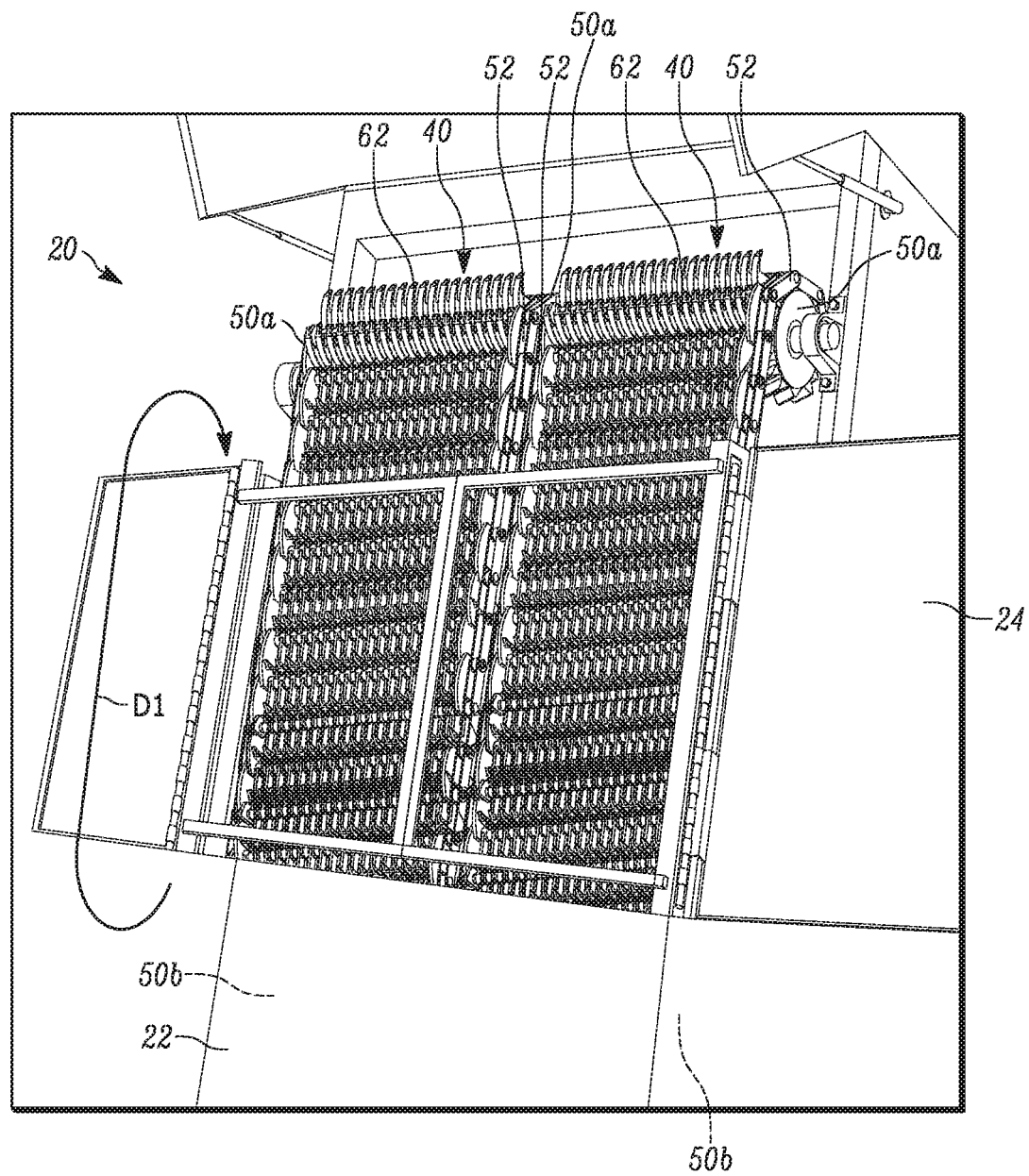
FIG. 2 is a schematic illustration of another sample water treatment system.

FIGS. 1-2 illustrate several known example water treatment systems 20. Each system 20 includes a housing 22 and a door 24 for accessing the housing interior. Filtering assemblies 40 are provided in the housing 22 interior for removing solid debris from incoming waste water (not shown). Although two filter assemblies 40 are shown more or fewer could be provided in the housing 22.

Each assembly 40 includes sprockets 50 symmetrically arranged in a rectangular pattern. More specifically, a first pair 50*a* of sprockets is positioned adjacent the top end of the filtering assembly 40. A second pair 50*b* of sprockets is positioned adjacent the bottom end of the filtering assembly 40. Alternatively, the upper sprockets 50*a* or lower sprockets 50*b* can be replaced with turnaround guides or guide rails (not shown). Articulating chains 52 are connected to the sprockets 50*a*, 50*b* and are drivable by the sprockets along a continuous path within the housing 22, indicated generally by the arrow D1. One chain 52 is connected to the sprockets 50*a*, 50*b* on the left side [as shown] of the housing 22. Another chain 52 is connected to the sprockets 50*a*, 50*b* on the right side [as shown] of the housing 22. The chains 52 forms endless loops around the respective sprockets 50*a*, 50*b* and extend generally parallel to one another.

Figure 3:
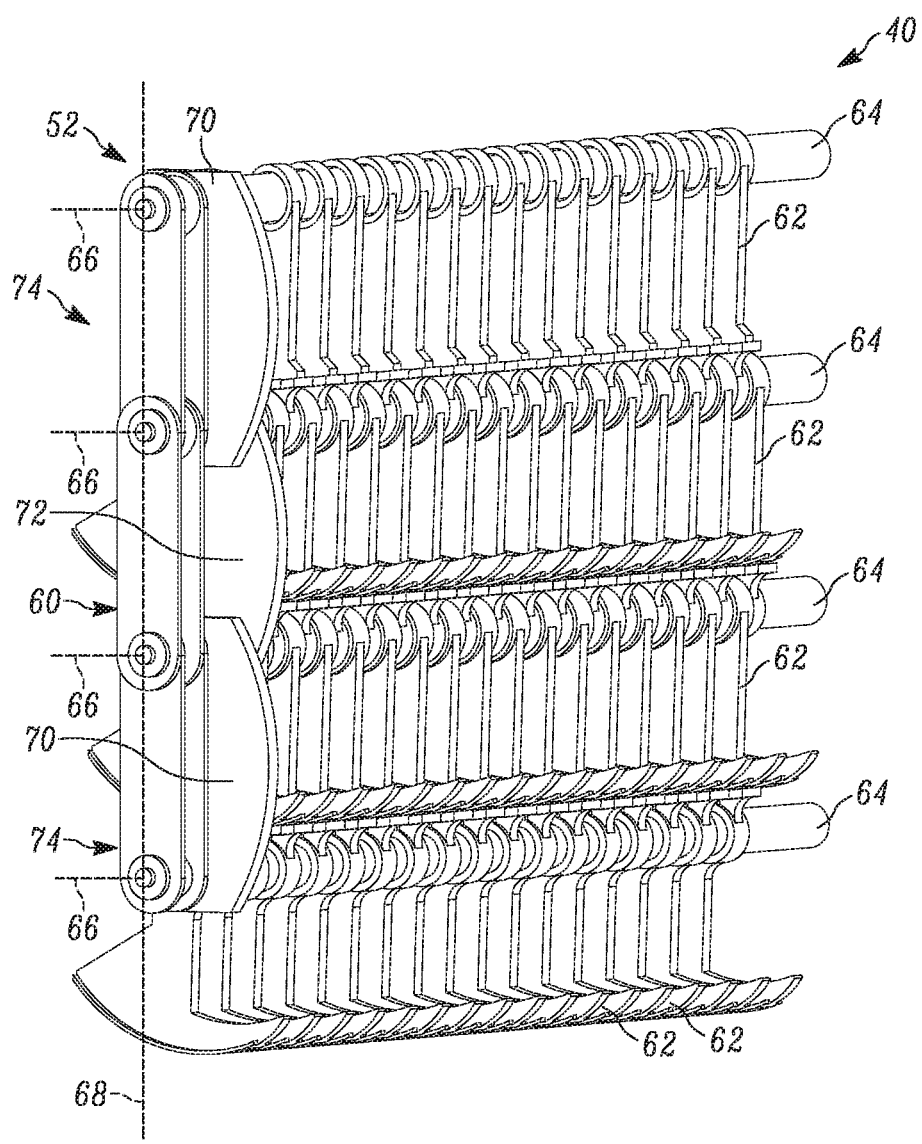
FIG. 3 is a schematic illustration of a portion of a filter element assembly for the water treatment systems of FIGS. 1-2.
Figure 4:
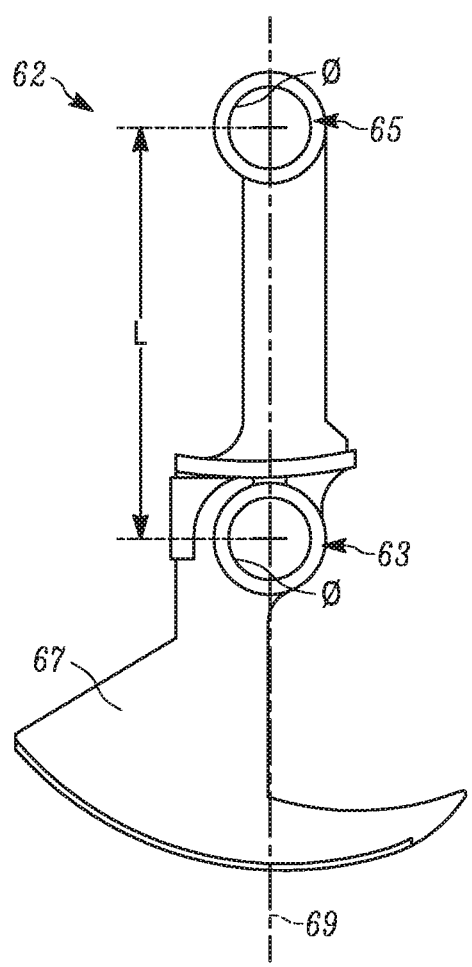
FIG. 4 is a side view of a filter element of FIG. 3.
Figure 5:
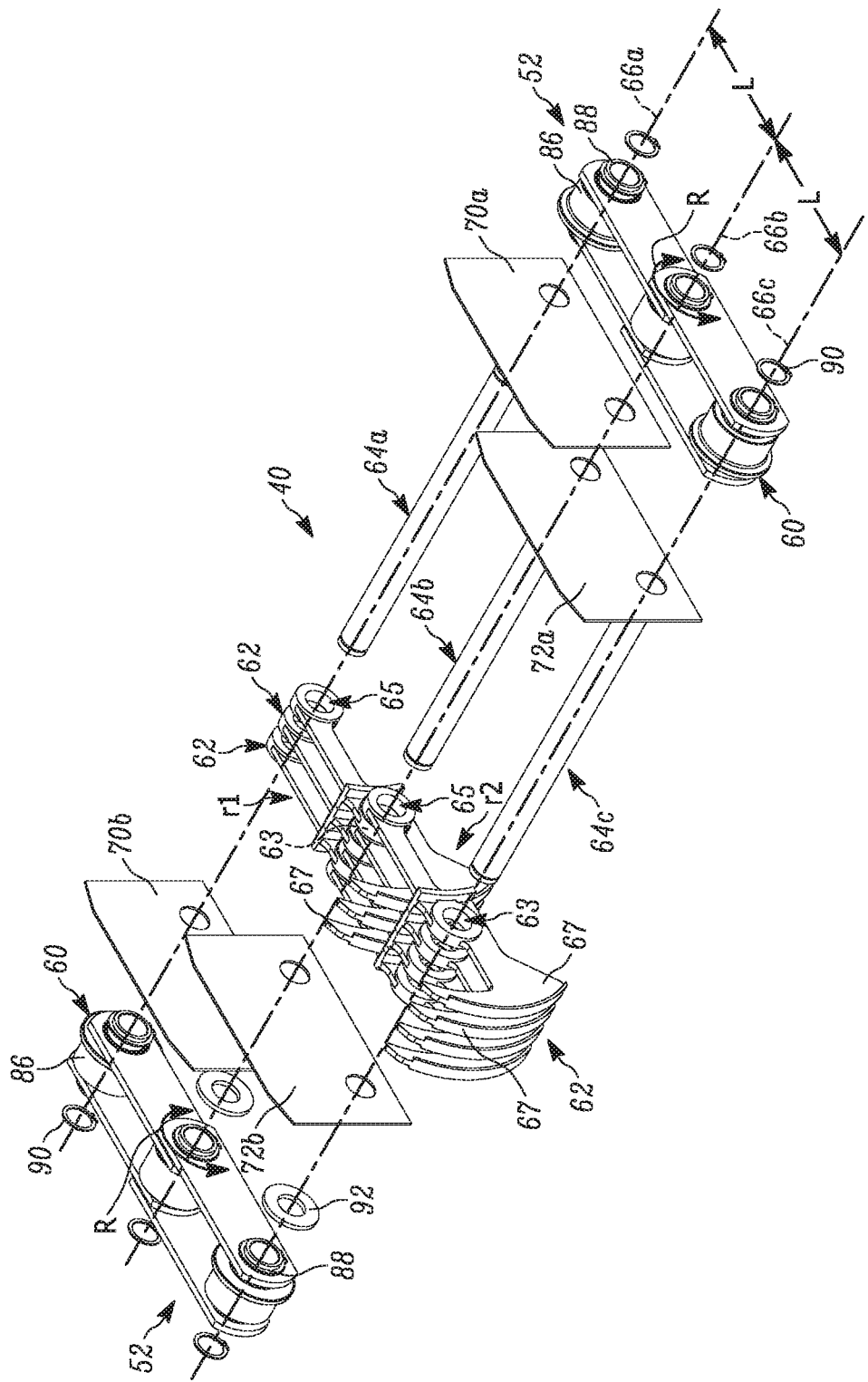
FIG. 5 is an exploded view of a portion of the assembly of FIG. 3.

FIGS. 3-5 illustrate more details of portions of the filter assembly 40. The chain 52 includes male links 60 and female links 74 interconnected end-to-end in an alternating manner to form the endless loops around the sprockets 50*a*, 50*b*. Filter shafts 64 extend into the chains 52 and through filter elements 62 to interconnect the chains and the filter elements. Referring to FIG. 4, each filter element 62 is elongated and includes a claw or hook-shaped projection 67 and a pair of openings 63, 65. The projection 67 and openings 63, 65 are generally aligned with one another along a centerline 69. The openings 63, 65 are spaced a predetermined distance L from one another. The openings 63, 65 have the same diameter Φ, e.g., about ¾". The links 60, 74, and filter elements 62 are formed from a rigid, corrosion-resistant material such as metal, plastic or fiberglass.

The filter elements 62 are arranged in rows $r_1, r_2 \ldots r_n$ with all the openings 65 aligned with one another in each row and all the openings 63 aligned with one another in each row. Adjacent rows, e.g., the rows $r_1$ and $r_2$, are overlapped or offset with one another such that the filter elements 62 of adjacent rows are interdigitated. To this end, the filter elements 62 within the same row are spaced laterally from one another while maintaining the alignment between the respective openings 63 and 65 in the row. The interdigitation repeats with subsequent rows of filter elements 62 until the filter elements form an endless loop along the entire length of the chain 52. Consequently, each row of filter elements 62 in the loop will overlap and interdigitate with the two adjacent rows of filter elements.

Due to this configuration, each shaft 64 extends through filter members 62 in multiple, adjacent rows. Referring to FIG. 5, the shaft 64a extends through the openings 65 in the filter members 62 in the row $r_1$ and the openings 63 in the filter members 62 in the row to the right of the $r_1$ (not shown). The shaft 64b extends through the openings 63 in the filter members 62 in the row $r_1$ and the openings 65 in the filter members 62 in the row $r_2$. The shaft 64c extends through the openings 63 in the filter members 62 in the row $r_2$ and the openings 65 in the filter members 62 in the row to the left of the row $r_2$ (not shown).

The interdigitated spacing and thickness of the filter elements 62 is configured to form spaces or gaps having a size and shape, e.g., rectangular, configured to capture solids/trash in the water/wastewater. The filter shafts 64 support the filter elements 62 on the chains 52 and allow for relative rotation between the shafts and the filter elements. This allows the chains 52, filter shafts 64, and filter elements 62 to navigate the turns around the sprockets 50. Centerlines 66 of the shafts 64 are positioned within the same plane 68 (see FIG. 3).

Referring to FIG. 5, side plates 70, 72 are provided on opposite ends of the filter shafts 64 around the entire endless loop. The side plates 70, 72 are given individual reference numbers in FIG. 5 for clarity. First side plates 70a, 70b include openings for receiving an end of the filter shaft 64a and an end of the filter shaft 64b. Second side plates 72a, 72b include openings for receiving an end of the shaft 64b and an end of the shaft 64c. Additional side plates 70, 72 (not shown) are connected to the ends of each consecutive pair of filter shafts 64 around the entire endless loop. Spacers 92 can be provided on the filter shafts 64 between the side plates 70, 72 and the chain 52.

Figure 6A:
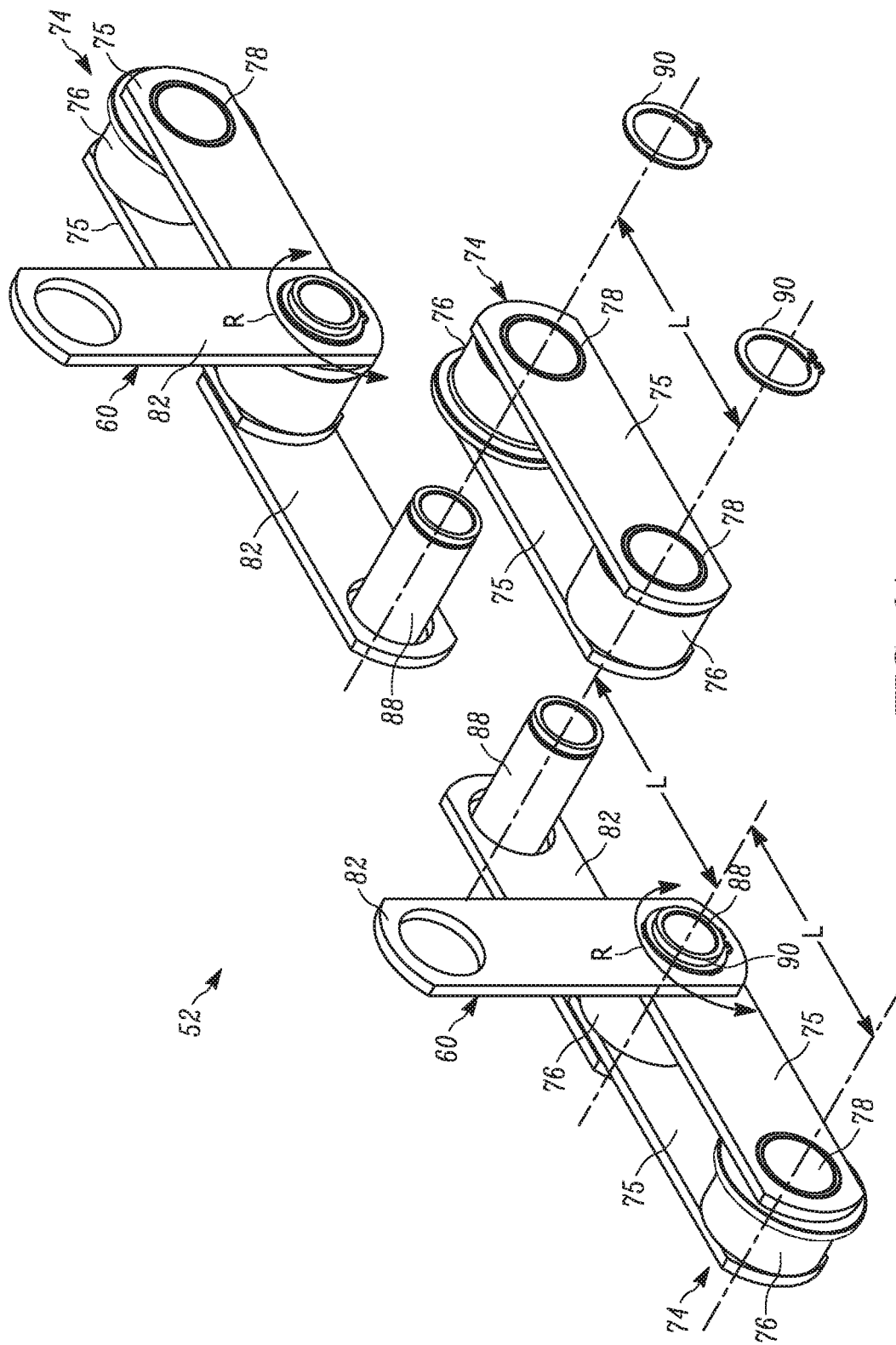
FIG. 6A is an exploded view of a portion of a chain for the assembly of FIG. 5.
Figure 6B:
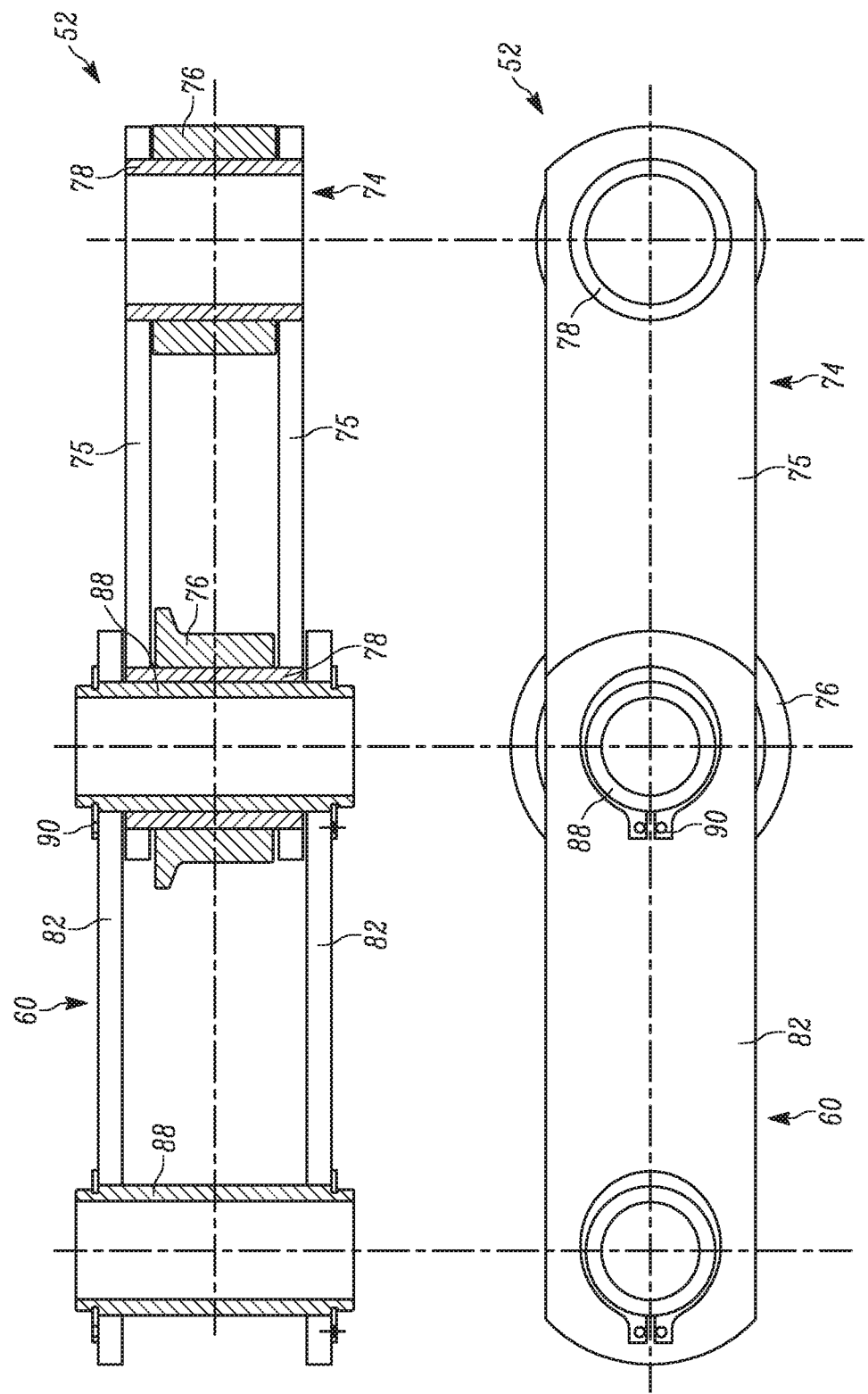
FIG. 6B is a section view of a portion of the chain of FIG. 6A.

Referring further to FIGS. 6A-6B, each male link 60 includes pairs of plates 82, a pair of shaft receiving members or pins 88, and snap rings 90. The shaft receiving members 88, e.g., hollow pins, are secured to and positioned between the plates 82 the distance L from one another. Each female link 74 includes a pair of plates 75, a pair of sprocket receiving members or rollers 76, and a pair of bushings 78. The sprocket receiving members 76 are secured to and positioned between the plates 75 the distance L apart from one another. The shaft receiving members 78, e.g., bushings, are connected to the receiving members 76 and the plates 75 so as to be coaxial with the receiving members.

Each filter shaft 64 extends through one of the rollers/receiving members 76, one of the bushings 78, and one of the pins 88. Consequently, every filter shaft 64 also extends through both plates 82 of the male link 60 and both plates 75 of the female link 74 to connect the links 60, 74 together. It will be appreciated that the chain 52 continues from what is shown in FIGS. 6A-6B, with additional male links 60 (not shown) being attached to the leftmost and rightmost female links 74, which are in turn connected to additional female links 74, etc.

Due to this construction the links 60, 74 are rotatable about the filter shafts 64 relative to one another. The snap rings 90 are secured within grooves (not shown) on the ends of the filter shafts 64 to prevent relative longitudinal movement between the filter shafts and the links 60, 74. Once fully assembled, the chains 52 provide fully articulatable endless loops that cooperate with the filter shafts 64 to move the filter members 62. In operation, one or more motors (not shown) drive the sprockets 50 to cause the chains 52 to follow the looped, upward path D1 (FIG. 2). The links 60, 74 rotate relative to one another in the direction $R_1$ (FIG. 6A) to allow the chains 52 to navigate the turns around the sprockets 50.

Referring to FIG. 1, as waste water enters the housing 20, the moving filter elements 62 trap debris, such as garbage, sediment, rocks, etc., and carry the debris out of the flowing water stream, thereby cleaning the stream. To this end, the projections 67 are configured to help scoop out or remove the debris. The elements 62 can be cleaned from time to time in a known manner to remove excess debris therefrom.

It can be desirable to convert the individual filter elements 62 in exchange for different filtering members or devices, such as a perforated screen, to filter incoming wastewater in a different manner. The present invention provides a kit for performing this conversion while maintaining—not removing or altering—a large percentage of the existing water treatment system 20, e.g., the sprockets 50, chains 52, side plates 70, 72, and filter shafts 64. To this end, the conversion can be accomplished without removing the chains 52 or by removing the chains and making the conversion on the ground. In any case, the conversion occurs without altering the size, spacing or arrangement of the shafts 64 and chains 52 on the filter assembly 40. This allows for an inexpensive, rapid conversion between filtering structures that can be performed on-site.

Figure 7A:
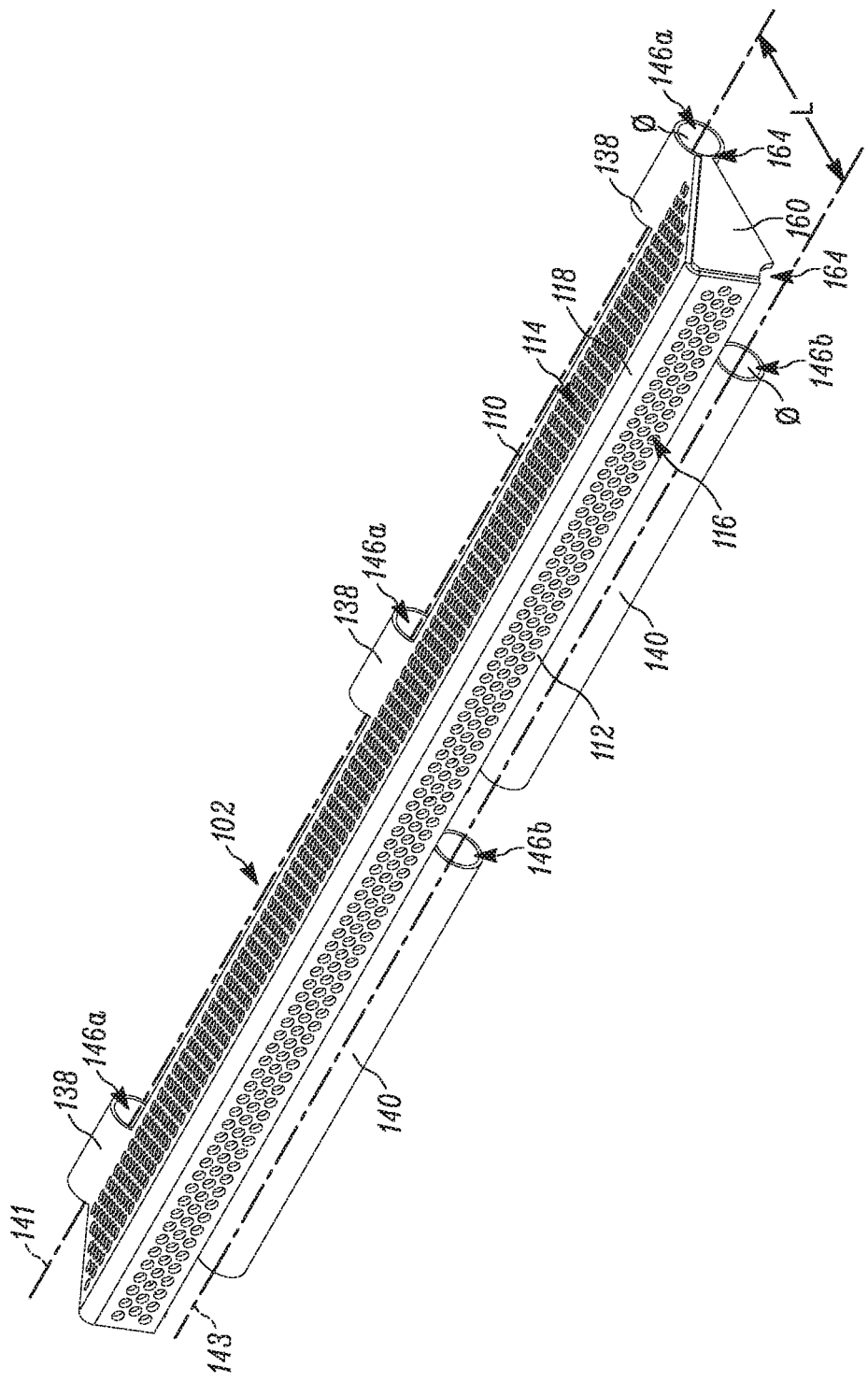
FIG. 7A is an example first conveyor segment of a kit in accordance with the present invention.
Figure 7B:
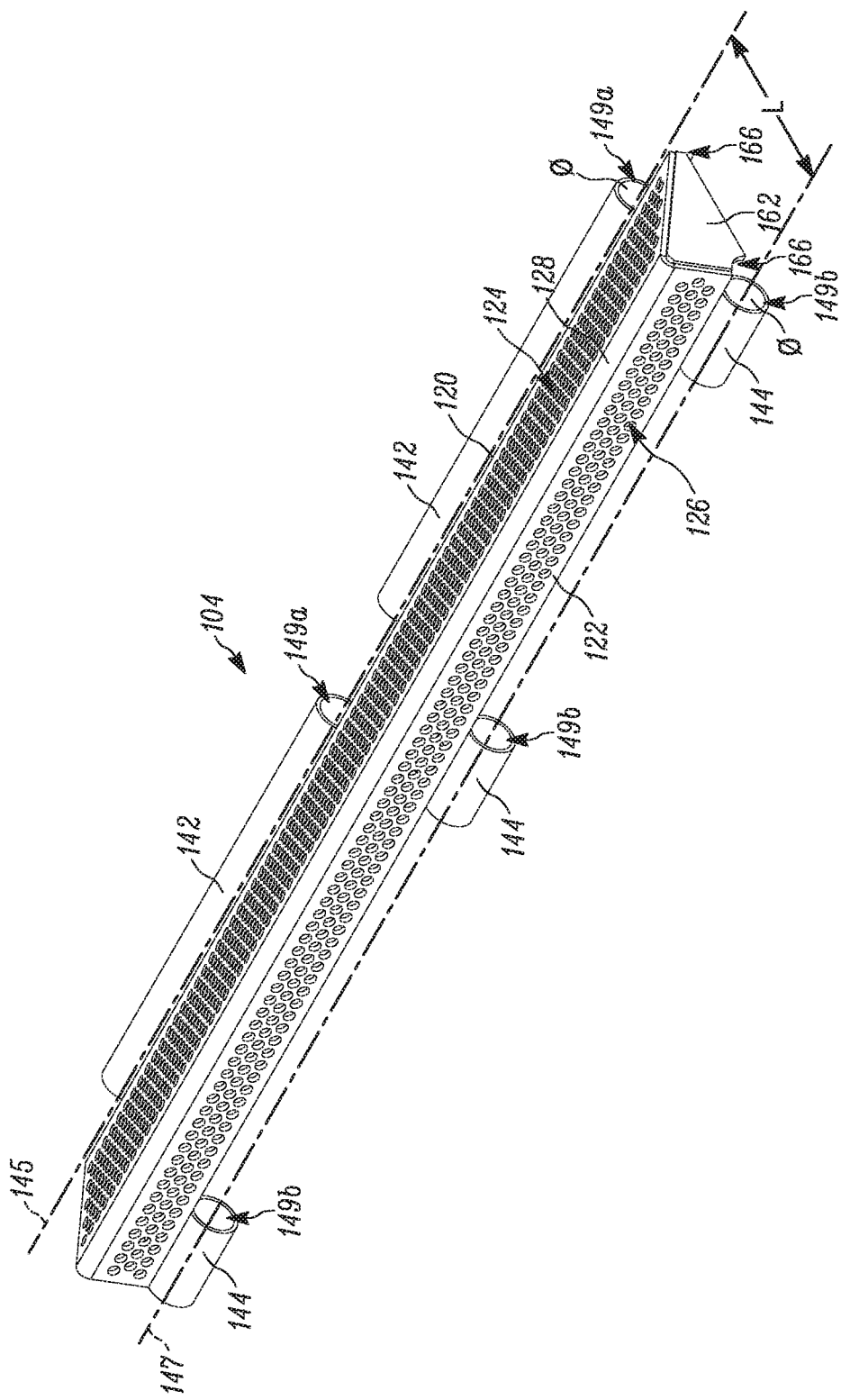
FIG. 7B is an example second conveyor segment of the kit.
Figure 8A:
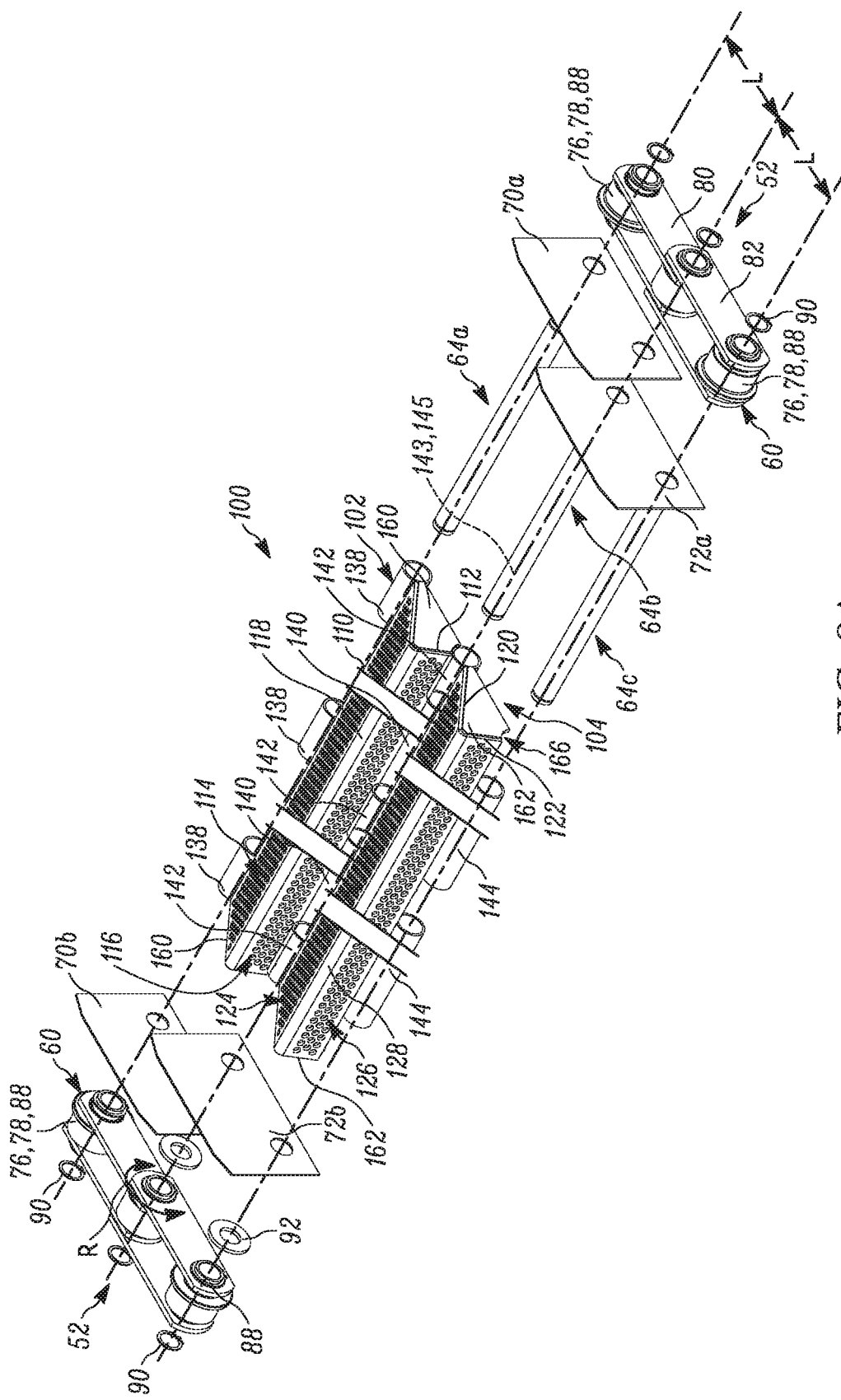
FIG. 8A is an exploded view of multiple kit conveyor segments and portions of the water treatment system.
Figure 8B:
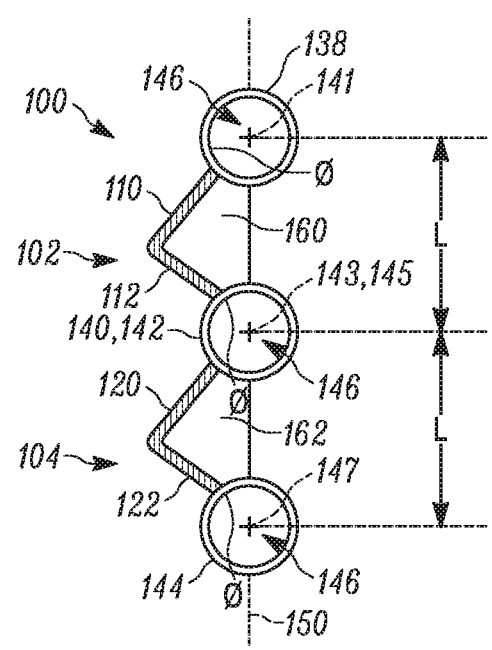
FIG. 8B is a side view of the kit conveyor segment of FIG. 8A.

FIGS. 7-8B illustrate an example wastewater filter kit 100 in accordance with the present invention. The kit 100 includes identical or substantially identical first and second conveyor segment 102, 104. When further multiplied, the conveyor segments 102, 104 constitute the entire conveyor for the wastewater treatment device 20, i.e., the conveyor segments collectively form an endless loop around the upper sprockets 50a and lower guide rails (or sprockets). Although identical, the construction of both conveyor segments 102, 104 will be discussed to improve clarity in using the kit 100. The kit 100 is designed such that the same hardware and components used to install and operate the filter elements 62 can be used to install and operate the conveyor segments 102, 104, e.g., the filter shafts 64, sprockets 50, chains 52, plates 70, 72, and rings 90 are all with during the conversion.

The first and second conveyor segments 102, 104 can be made of a rigid, corrosion-resistant material, such as a metal, polymer or plastic. As shown in FIG. 7A, the first conveyor segment 102 is a step-shaped or L-shaped panel including a first portion 110 and a second portion 112 angled relative to one another. Perforations or openings 114 extend entirely through the first portion 110 and are arranged in a predetermined pattern. Perforations or openings 116 extend through the second portion 112 and are arranged in a predetermined pattern. The openings 114, 116 are all sized to allow wastewater to pass therethrough but prevent debris of a predetermined size, e.g., garbage, solid or semi-solid particulate, from passing therethrough. Consequently, the perforations 114, 116 can have any shape, e.g., round, circular, elliptical, oval or polygonal.

An un-perforated area 118 non-rotatably connects ends of the first and second portions 110, 112 together at the bend or apex of the conveyor segment 102. The first and second portions 110, 112 can be integrally formed together with the un-perforated area 118 or separate components securely fixed together.

Tubes 138, 140 are secured to opposite ends of the first conveyor segment 102. More specifically, first tubes 138 are secured to a free end or edge of the first portion 110, i.e., the end not connected to the area 118. The tubes 138 are spaced from one another along a centerline 141 and define circular passages 146a having the diameter Φ. As shown, three tubes 138 are provided along the end of the first portion 110, although more or fewer tubes, including one, can be provided.

Second tubes 140 are secured to a free end or edge of the second portion 112, i.e., the end not secured to the area 118. The tubes 140 are spaced from one another along a centerline 143 and define circular passages 146b having the diameter 1. As shown, three tubes 140 are provided along the end of the second portion 112, although more or fewer tubes, including one, can be provided. In any case, the centerlines 141, 143 are spaced the distance L from one another.

As shown in FIG. 7B, the second conveyor segment 104 is also a step-shaped or L-shaped panel including a first portion 120 and a second portion 122 angled relative to one another. Perforations or openings 124 extend through the first portion 120 and are arranged in a predetermined pattern. Perforations or openings 126 extend through the second portion 122 and are arranged in a predetermined pattern. The openings 124, 126 are all sized to allow wastewater to pass therethrough but prevent debris of a predetermined size, e.g., garbage, solid or semi-solid particulate, from passing therethrough. An un-perforated area 128 non-rotatably connects ends of the first and second portions 120, 122 together at the bend or apex of the conveyor segment 104.

Tubes 142, 144 are secured to opposite ends of the second conveyor segment 104. More specifically, first tubes 142 are secured to a free end or edge of the first portion 120, i.e., the end not connected to the area 128. The tubes 142 are spaced from one another along a centerline 145 and define circular passages 149a having the diameter 1. As shown, two tubes 142 are provided along the end of the first portion 120, although more or fewer can be provided.

Second tubes 144 are secured to a free end or edge of the second portion 122, i.e., the end not connected to the area 128. The tubes 144 are spaced from one another along a centerline 147 and define circular passages 149b having the diameter 1. As shown, three tubes 144 are provided along the end of the second portion 122, although more or fewer can be provided. In any case, the centerlines 145, 147 are spaced the distance L from one another.

It will be appreciated that the tubes 138, 140, 142, 144 all define passages 146a, 146b, 149a, 149b having substantially the same diameter 1 as the openings 63, 65 in the filter elements 62 (see FIG. 4). The passages 146a, 146b, 149a, 149b can have, for example, about a ¾" diameter and the shafts 64 can have about a ¾" diameter. Similarly, the tubes 138, 140 on the first segment 102 and the tubes 142, 144 on the second segment 104 are respectively spaced the same distance L apart from one another as the openings 63, 65.

Panels 160 are secured to both open ends of the first conveyor segment 102. The corners of each panel 160 include rounded notches 164 for receiving the tubes 138, 140. Panels 162 are secured to both open ends of the second conveyor segment 104. The corners of each panel 162 include rounded notches 166 for receiving the tubes 142, 144. As shown, none of the end panels 160, 162 is perforated or has openings.

When it is desired to replace the filter elements 62 with the conveyor segments, the user ceases movement of the chain 52 and removes the shafts 64 from the openings 63, 65 in the filter elements. This can be accomplished by removing the snap rings 90 (see FIG. 6A) from one or both ends of the shafts 64 to allow the shafts to move longitudinally relative to the chains 52 at each end thereof. More specifically, removing the snap rings 90 allows each shaft 64 to be removed from the respective receiving members 76, bushings 78, and receiving members 88, thereby allowing the filter elements 62 to be removed from that shaft.

The chains 52, however, can be left in place connected to the sprocket(s) 50. The process is repeated for each shaft 64 along the entire length of the chains 52 until all the filter elements 62 are removed. This may necessitate incrementally advancing the chains 52 around the loop to allow the user to readily access the shafts 64 and filter elements 62 to be removed through the housing door 24.

Then, with the chains 52 stationary, the conveyor segment 102 is positioned between the chains with the passages 146 of the tubes 138, 140 positioned between and aligned with the receiving members 76, bushings 78, and receiving members 88 on the links 60, 74. In the example shown in FIG. 8A, the tubes 138 are aligned with the receiving members 88 that receive the shaft 64a. The tubes 140 are aligned with the receiving members 88 that receive the shaft 64b.

The other conveyor segment 104 is oriented in the same manner as the conveyor segment 102 (as shown with the first portion 120 being to the right of the second portion 122). The tubes 142 on the conveyor segment 104 are positioned between the tubes 140 on the conveyor segment 102 to align their respective axes 143, 145 in a coextensive manner. This likewise aligns the passages 146b, 149a. As a result, the tubes 140, 142 interdigitate with one another. This aligns the tubes 142 with the receiving members 88 that receive the shaft 64b. The tubes 144 on the conveyor segment 104 are aligned with the receiving members 88 that receive the shaft 64c.

The aligned, interdigitated tubes 140, 142 extend substantially the entire length of the conveyor segments 102, 104. The aligned tubes 140, 142 can abut one another or be in close proximity to prevent debris from flowing/moving radially into the passages 146a, 146b, 149a, 149b of the tubes 140, 142. The plates 70a, 70b, 72a, 72b are returned to their positions adjacent the chains 52 on either side of the conveyor segment 100.

As shown in FIG. 8B, the centerlines 141, 143, 145, 147 of the tubes 138, 140, 142, 144 are all positioned within a common plane 150. The tubes 138, 140, 142, 144 are spaced the same distance L from one another within the plane 150 as the openings 63, 65 in the filter elements 62 are spaced from one another within the plane 68. The passages 146a, 146b, 149a, 149b all have the same diameter 1. The tubes 138, 140, 142, 144 therefore have the same size, shape, and spatial arrangement within the plane 150 as the openings 63, 65 and the shafts 64 have within the plane 68. Consequently, the tube passages 146a, 146b, 149a, 149b and filter element openings 63, 65 are each readily configured to receive the same filter shafts 64 in the same manner.

With this in mind, the filter shaft 64*b* is extended through the passages 146*b*, 149*a* in the tubes 140, 142 of both conveyor segments 102, 104, the opening in the plates 70*a*, 70*b*, 72*a*, 72*b*, and the receiving members 88 in both chains 52. The snap rings 90 are secured to the ends of the filter shaft 64*b* along the exterior of the chains 52 to prevent relative longitudinal movement between the filter shaft and the chains. This configuration allows the conveyor segments 102, 104 to rotate about the filter shaft 64*b* while preventing separation of the conveyor segments from the chains 52. More specifically, the tubes 140, 142 on the conveyor segments 102, 104 cooperate with one another and with the filter shaft 64*b* to form a hinge by which the conveyor segments can rotate about the filter shaft relative to one another and relative to the filter shaft.

This process is repeated for each subsequent conveyor segment 102, 104 in an alternating manner until a closed loop conveyor is formed around the sprockets 50 and corresponding structure at the bottom of the housing 22. In each case, the tubes 138, 140 on the first conveyor segment 102 will interdigitate with the tubes 142, 144 on the adjacent second conveyor segment 104 along a common centerline, e.g., the tubes 138 interdigitate with the tubes 144 and the tubes 140 interdigitate with the tubes 142. One of the filter shafts 64 extends through the interdigitated tubes 138, 144 or 140, 142 and into the receiving members 78 on the chains 52 to form a hinge between the shaft and the conveyor segments 102, 104. The snap rings 90 are secured to the ends of each filter shaft 64 to prevent relative longitudinal movement between that particular filter shaft and the chains 52. The process is the same regardless of how many tubes on each conveyor segment 102, 104 interdigitate within one another.

Figure 9:
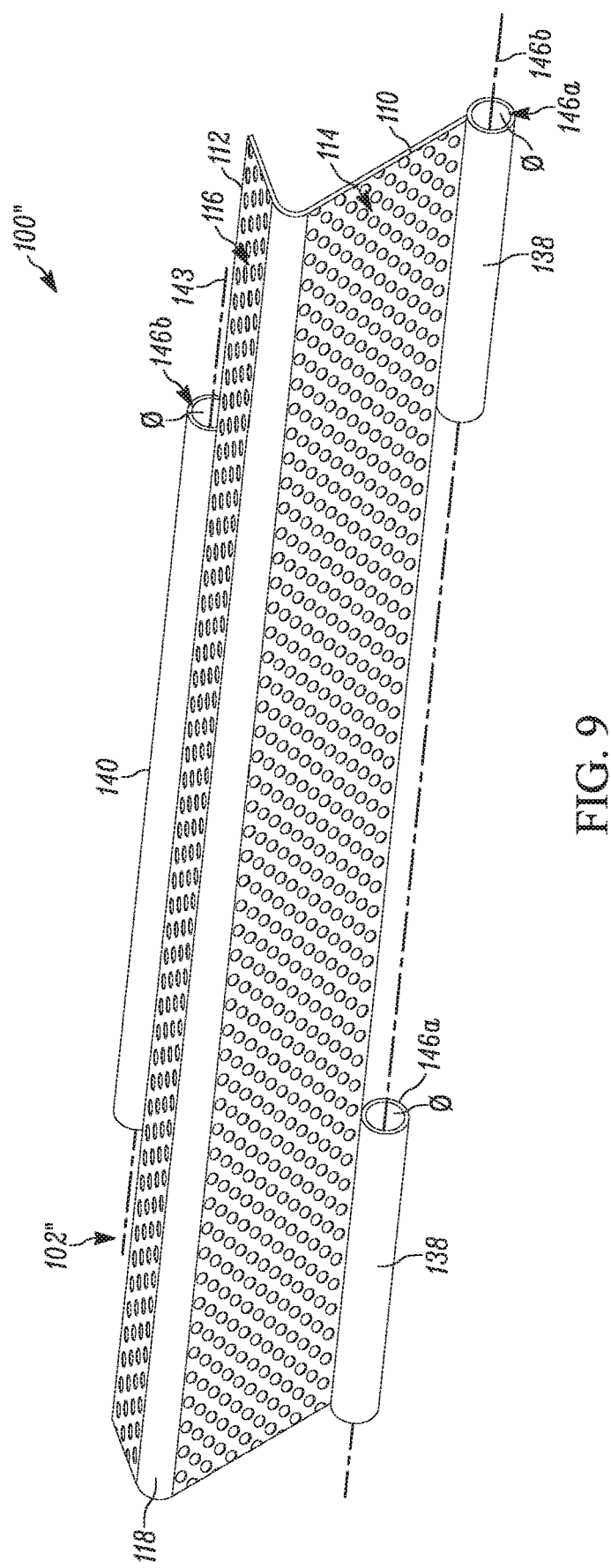
FIG. 9 is another example kit conveyor segment.

FIG. 9 illustrates another example conveyor segment 102" having a different number of tubes attached thereto. In this configuration, the first portion 110 includes a pair of tubes 138 and the second portion 112 includes a single tube 140. The centerline 141 of the tubes 138 is spaced the distance L from the centerline 143 of the tubes 140. Each tube 138, 140 defines the respective passages 146*a*, 146*b* having the diameter 1. The tube 140 of the conveyor segment 102" will interdigitate with the tubes 138 of the adjacent, identical conveyor segment (not shown but above the conveyor segment 102") along the common centerline 143 and receive a shaft 64 to form a hinge between the shaft and conveyor segments. The tubes 138 of the conveyor segment 102" will interdigitate with the tube 140 of the adjacent, identical conveyor segment (not shown but below the conveyor segment 102") along the common centerline 141 and receive a shaft to form a hinge between the shaft and conveyor segments. The shafts 64 extending through the conveyor segments 102" will be secured to the links 60, 72 on the chains 52 in the same manner described above.

Figure 10:
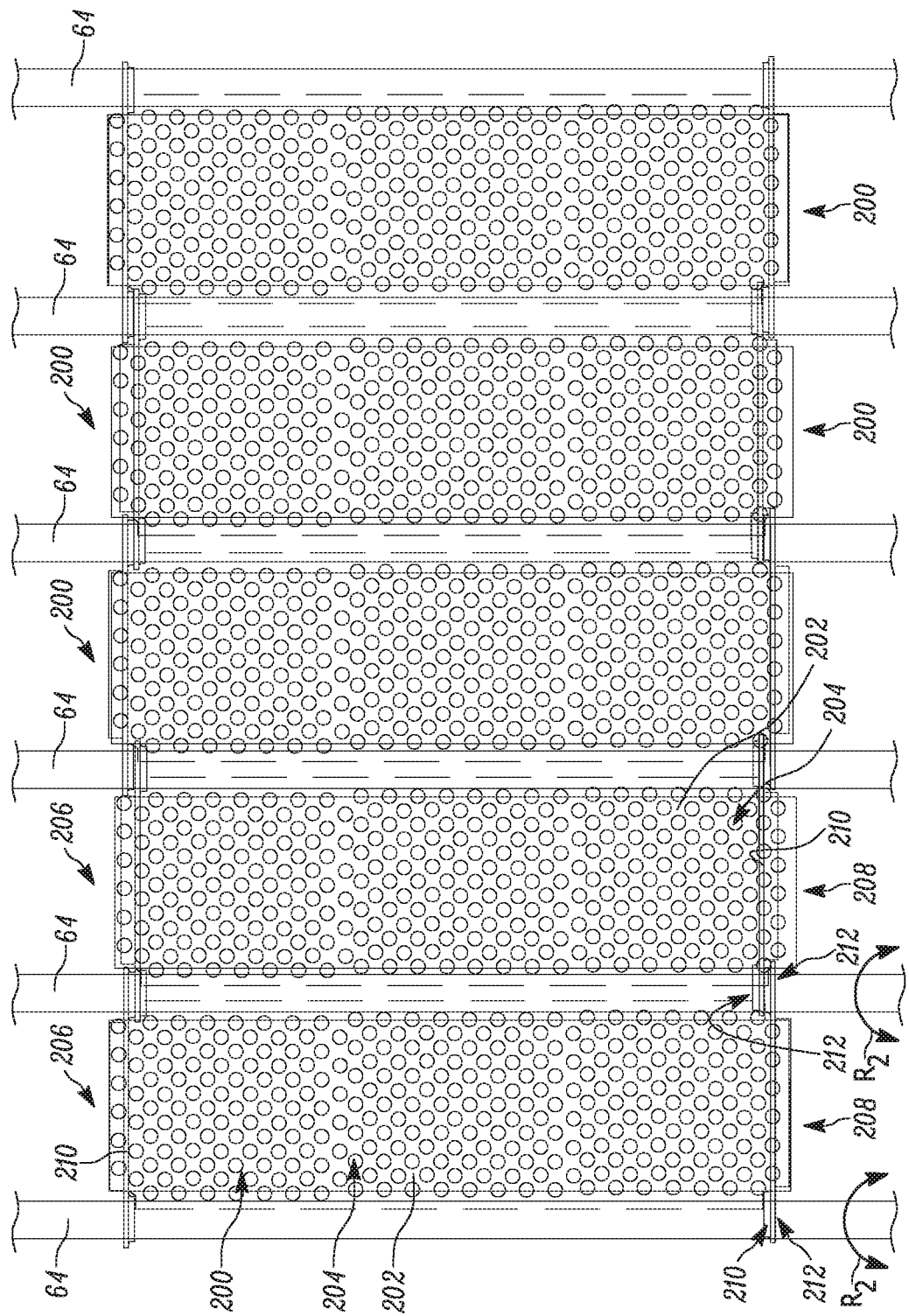
FIGS. 10-11 illustrate another example conveyor segment.
Figure 11:
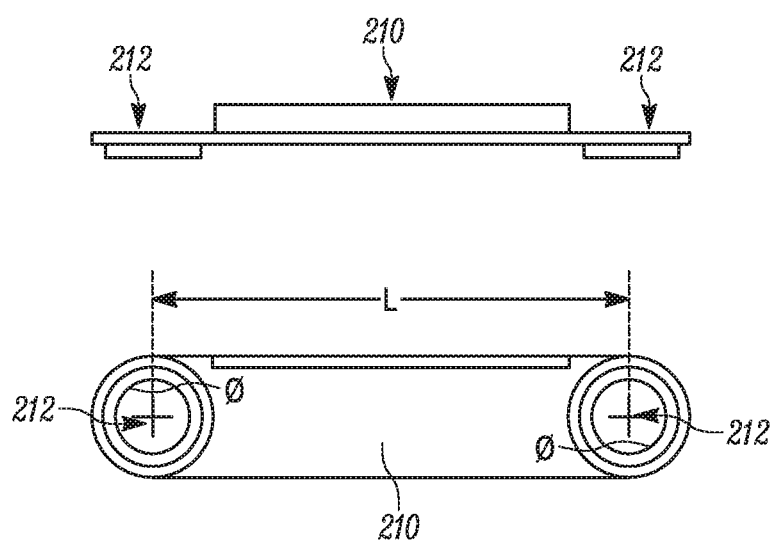

FIGS. 10-11 illustrate another example conveyor segment 200 defined by a single, substantially planar panel 202. The panel 202 is elongated and extends between opposite ends 206, 208. Perforations 204 extend through the panel 202. A mounting bracket 210 is secured to each end 206, 208. The mounting bracket 210 is generally rectangular and includes a pair of openings 212 for receiving the shafts 64. The openings 212 are spaced the distance L apart and each has the diameter 1. The mounting brackets 210 therefore define the tubes corresponding in function to the tubes 138, 140, 142, 144 in the other example conveyor segments. Alternatively, the mounting bracket 210 can include or be replaced with elongated tubes similar to those used for the conveyor segments 102, 104 (not shown). In any case, the mounting brackets 210 allow the conveyor segments 200 to rotate or pivot $R_2$ relative to one another and relative to the shafts 64. The conveyor segments 200 and mounting brackets 210 can be, for example, stamped, formed, and/or drilled.

Figure 12:
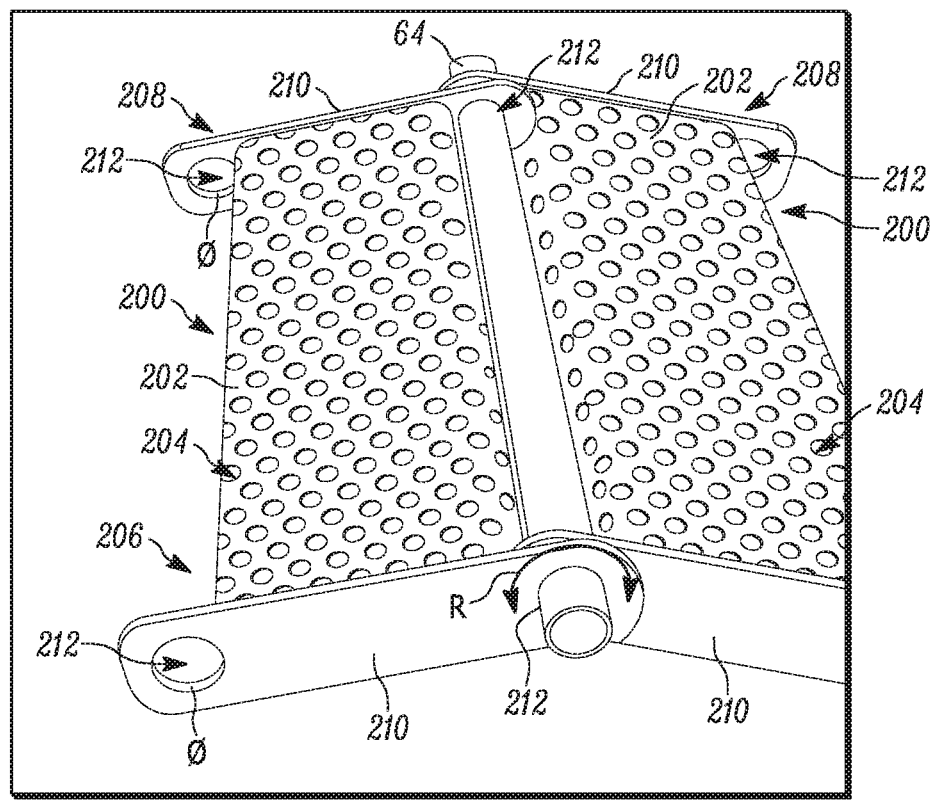
FIG. 12 illustrates another example conveyor segment.

In a modified version of the conveyor segment 200 shown in FIG. 12, the panel 202 is bent or curved at its ends 206, 208 and is longitudinally positioned entirely between the brackets 210. The tubes are defined by the openings 212 extending entirely through the brackets 210.

It will be appreciated that any conveyor segment configuration shown, described or contemplated will likewise include a perforated panel and be configured to interdigitate with the adjacent conveyor segments and form hinged connections therewith. In any case, the connection between the conveyor segments is accomplished without requiring any direct connection or securing between the conveyor segments and the chains. The connections between the conveyor segments, shafts, and chains allow the conveyor segments to articulate relative to one another about the shafts in order to navigate the turns of the endless loop.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A wastewater filter conversion kit for replacing filter elements connected to chains by a shaft, comprising:
   first and second conveyor segments each including:
      a perforated panel having first and second ends each defining a width of the perforated panel;
      first and second brackets secured to the first and second ends of the perforated panel;
      a pair of first tubes provided on the first bracket; and
      a pair of second tubes provided on the second bracket;
   wherein one of the pair of first tubes on the first conveyor segment, one of the pair of first tubes on the second conveyor segment, one of the pair of second tubes on the first conveyor segment, and one of the pair of second tubes on the second conveyor segment are all aligned along a common centerline for receiving the shaft to replace the filter elements on the shaft.

2. The wastewater filter conversion kit of claim 1, wherein each of the first and second conveyor segments acts as a filter.

3. The wastewater filter conversion kit of claim 1, wherein the pair of first tubes comprises openings extending through the first bracket and the pair of second tubes comprises openings extending through the second bracket.

4. The wastewater filter conversion kit of claim 1, wherein each of the first and second conveyor segments is pivotable about the common centerline relative to one another and the first and second brackets extend longitudinally in a direction perpendicular to the common centerline.

5. The wastewater filter conversion kit of claim 1, wherein each of the first and second brackets spans the width of the perforated panel.

6. The wastewater filter conversion kit of claim 1, wherein each of the first and second brackets is planar.

7. A wastewater filter conversion kit for replacing filter elements connected to chains by a shaft, comprising:
   first and second conveyor segments each including:

a perforated panel having first and second ends;

first and second brackets secured to the first and second ends of the perforated panel, each of the first and second brackets including a tube aligned with one another for receiving the shaft to replace the filter elements on the shaft;

wherein the tubes cooperate to define a centerline about which the first and second conveyor segments are pivotable relative to one another, wherein the first and second brackets have respective lengths extending perpendicular to the centerline.

8. The wastewater filter conversion kit of claim 7, wherein each of the first and second brackets is planar.

\* \* \* \* \*